July 1, 1941. W. S. COTTLE 2,247,607
LEAF LIFTER
Filed Jan. 23, 1940 2 Sheets-Sheet 1

William S. Cottle, INVENTOR
BY Victor J. Evans & Co.
ATTORNEYS

July 1, 1941.　　W. S. COTTLE　　2,247,607
LEAF LIFTER
Filed Jan. 23, 1940　　2 Sheets-Sheet 2
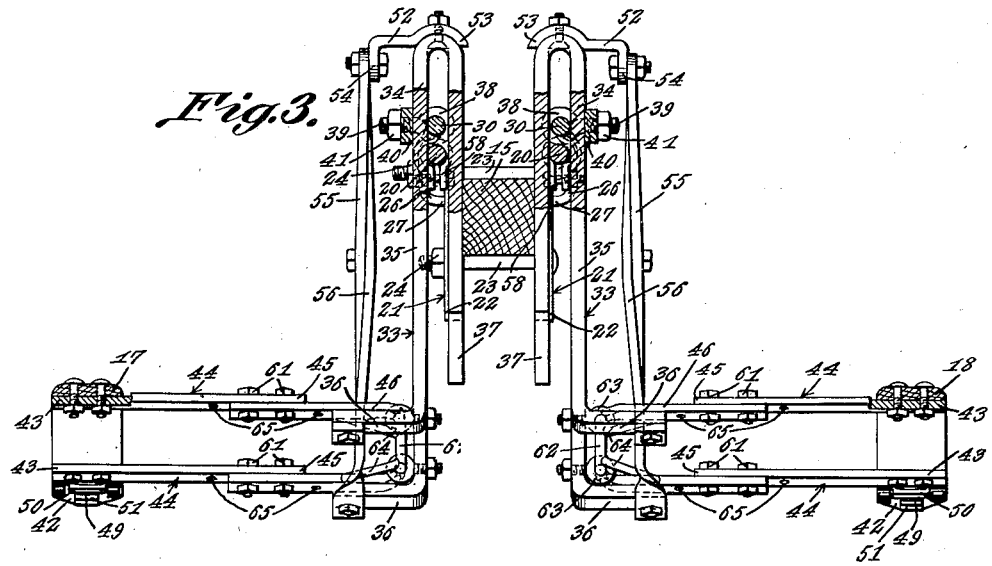
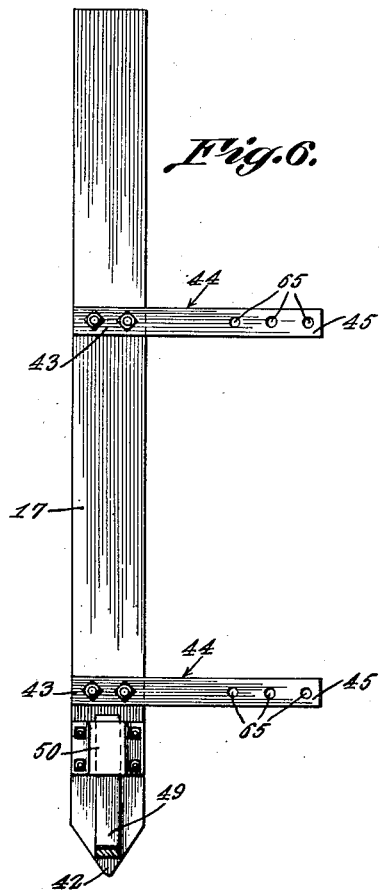
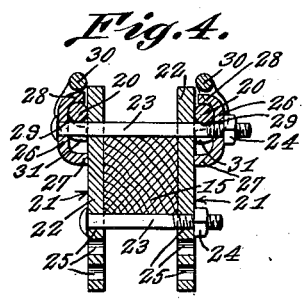
William S. Cottle, INVENTOR
BY Victor J. Evans & Co.
ATTORNEYS Patented July 1, 1941

2,247,607

UNITED STATES PATENT OFFICE 2,247,607

LEAF LIFTER

William Shelton Cottle, Beulaville, N. C.

Application January 23, 1940, Serial No. 315,248

7 Claims. (Cl. 97—192)

My invention relates to new and useful improvements in cultivator attachments.

An important object of my invention is the provision of a cultivator attachment that is adapted to travel between adjacent rows of plants in a manner to raise the leaves of the plants in advance of the plow and to permit the same to fall gently to the ground after the plow has passed.

Another object of my invention is the provision of a cultivator attachment of the above-mentioned character wherein the attachment is uniquely positioned so that the forward end thereof will readily pass below and elevate the lowermost leaves to permit the plow to throw the earth laterally around the roots of the plants.

Still another object of my invention is the provision of a cultivator attachment characterized by the fact that the attachment is pivotally and detachably associated with the plow in a manner whereby the lifters may readily accommodate themselves to normal undulations of the ground, but in the event that one of the lifters strikes an immovable object, such as a rock or stump, it will automatically detach itself from the plow without injury either to the plow or to the lifter.

Other objects and advantages of my invention will be apparent during the course of the following description.

Figure 1:
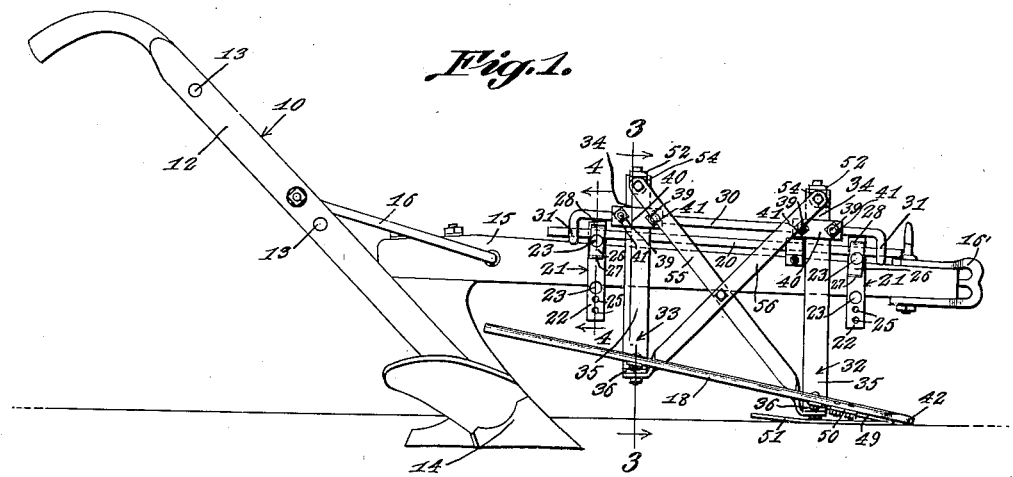
Figure 2:
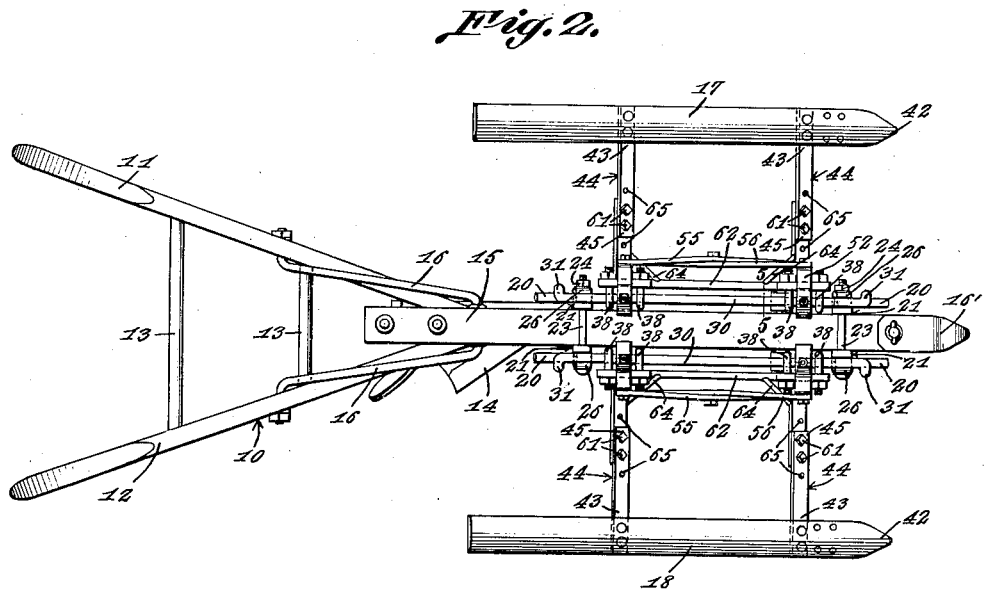

In the drawings, forming a part of this specification, and wherein like numerals are employed to designate like parts throughout the same, Figure 1 is a side elevation of a device embodying my invention, and showing the same associated with a plow, Figure 2 is a top plan view thereof, Figure 3 is a vertical sectional view taken on the line 3—3 of Figure 1, Figure 4 is a vertical sectional view taken on the line 4—4 of Figure 1, Figure 5 is a vertical sectional view taken on the line 5—5 of Figure 2, and Figure 6 is a bottom plan view of the lifter bar embodying a part of my invention.

In the accompanying drawings, wherein for the purpose of illustration is shown a preferred embodiment of my invention, the numeral 10 designates a walking plow of conventional design and construction which includes spaced handles 11 and 12 joined by the transverse brace rods 13 and connected at their lower end to the plow share 14. The plow beam 15 is bolted, or otherwise secured, to the upper end of the plow share and pivoted to the handles 11 and 12 by the U-shaped bracket 16. The forward end of the beam 15 is provided with a clevis 16' for attachment to a tractor, or other towing means.

My invention is adapted to be applied to the plow beam 15 and comprises forwardly and downwardly inclined lifting bars 17 and 18 disposed at opposite sides of the beam by means hereinafter described in detail, and positioned to travel between adjacent rows of growing plants in a manner whereby the forward ends thereof will pass under the lowermost leaves of the plants to raise the same above the ground until the plow share 14 has passed, and to thereafter permit the same to fall gently to the ground rearwardly of the plow share.

The means for attaching the lifting bars to the plow beam comprises stationary support rods 20 held by the clamps 21 and disposed laterally of the vertical sides of the plow beam. The clamps 21 comprise a vertically disposed bar 22 applied to opposite sides of the plow beam and connected above and below the beam by the bolts 23 and nuts 24. The bars preferably extend a substantial distance below the plow beam and the depending end portions are formed with a plurality of spaced openings 25 which permit the bars to be easily and expeditiously applied to varying sizes of plow beams. The spring clamping arms 26 are substantially U-shaped in side elevation and the lower ends 27 thereof are welded, or otherwise secured, to the outer face of the bars 22. The upper ends 28 of the clamping arms are unattached and spaced slightly from the bars 22, as clearly illustrated in Figure 4. The bolt 23, disposed above the plow beam, extends through the clamping arms 26 at substantially their middle to provide openings 29 defined by the bolt and the unattached upper ends 28 of the arms. A clamp 21 is disposed at the forward end of the beam adjacent the clevis, and another of the clamps is carried by the beam adjacent the rearward end thereof in a manner whereby the opposite ends of the stationary guide rod 20 may be received by the openings 29 hereinabove described. When the nut 24 of the upper bolt 23 is tightened, the unattached upper ends 28 of the clamps will be moved in the direction of the bars 22 to frictionally engage the guide rods to hold the same against axial displacement and spaced laterally of the plow beam a distance determined by the thickness of the bars 22.

Sliding guide rods 30 are positioned in spaced parallel relation with the stationary rods 20 and are formed with depending ends 31, the extremities of which are arcuately bent in a manner to be fitted to the outer peripheral side of the stationary bars beyond the clamps 21. The main portion of the sliding guide rods are disposed above the stationary rods and the curved ends thereof extend around and slightly under the stationary rods 20, as best illustrated in Figure 4.

The upper ends 34 of the front and rear supports 32 and 33 are bent back upon themselves to define inverted U-shaped portions, the outer arms 35 of which terminate in outwardly extending ends 36. The inner arms 37 of the U-shaped upper ends of the supports are inserted between the sliding and stationary guide rods 30 and 20 and the plow beam in a manner to bear against the vertical sides of the plow beam. The supports are preferably positioned intermediate but adjacent to the clamps 21, and the inner arms 37 thereof bear against but are not connected to the plow beam to permit vertical adjustment of the supports relative to the beam.

Eye-bolts 38 are carried by the sliding guide rod 30 at opposite sides of the supports 32 and 33 and with the threaded shank portions 39 thereof extending outwardly in embracing relation thereto to receive the clamp bar 40 and nuts 41, as illustrated in Figure 3. Tightening of the nuts 41 against the clamping bars 40 will bind the bar against the outer arm 35 of the supports and the supports, in turn, against the sliding guide rod 30 to fixedly associate the support with the sliding guide rod in a selected vertically adjusted position. The eye-bolts extend rearwardly of the rod 30 above and in engagement with the stationary guide rod 20, as illustrated in Figure 3, in a manner to support the members 32 and 33 from the stationary rod. The curved ends 31 of the guide rod 30 engage with the side and a portion of the bottom periphery of the rod 20 to normally hold the support from moving upwardly relative to the plow beam. The eye-bolts extend slightly beyond the vertical center of the guide rod 20 and the curved ends of the rod 30 will cooperate therewith to securely hold the supports to the stationary guide rod under ordinary conditions. The engagement of the ends 31 and the eye-bolts with the stationary guide rod should be of a nature to hold but not to bind the same in a manner to permit the curved ends of the rod 30 to release the rod 20 if an excessive stress is brought to bear thereon, as by the lifter 17 or 18 striking a root, stump or rock.

The longitudinal edges of the lifting bars 17 and 18 are rounded to prevent damage to the tobacco leaves and the forward ends 42 thereof are pointed. The bars are preferably of sufficient length to extend slightly forwardly of the front support 32 and rearwardly of the forward end of the plow share 14. The ends 43 of the extension rods 44 are received below and bolted to the lifting bars and the opposite ends 45 thereof are secured to the outwardly extending ends of the U-shaped brackets 46 by means of the bolts 61. The middle portions 62 of the brackets 46 are rounded and pivotally received by the eye-bolts 63 which, in turn, are fixedly connected to the outer arms 35 adjacent the juncture thereof with the extending ends 36. The diagonally disposed brace members 64 are welded, or otherwise secured, to the brackets and, in addition to imparting a substantial rigidity thereto, limit the extent of sliding movement of the brackets relative to the eye-bolts. The extending ends of the brackets rest upon and are supported by the extending ends 36 of the supports and the extremities thereof as well as the ends 45 of the extension bars are provided with a plurality of spaced openings 65 which permit the lifters to be easily adjusted laterally of the plow beam.

As illustrated in Figure 1, the outer arm 35 of the front support 32 is of substantially greater length than the outer arm 35 of the rear support 33, whereby the lifters will be held in a forwardly and downwardly inclined position. When mounted in this manner the pointed forward ends 42 of the lifters will be spaced slightly above the surface of the ground. Runners 49 are carried by the bottom sides of the lifting bars and are of substantially V-shaped formation, one arm of the runners being of substantially greater length than the other of the arms. The shorter arm is slidably received by a channeled bracket 50 which is bolted, or otherwise secured, to the underside of the lifter bar forwardly of the front extension bar 43. When mounted in this manner, the longer arm 51 will be in engagement with the ground whereby the forward end 42 of the bars will be maintained in slightly spaced relation with the ground at all times.

Brackets 52 are formed with arcuately curved ends 53 which fit over and are bolted to the upper ends of the supports. The outwardly extending ends of the brackets are formed with depending shank portions 54 and the upper ends of the cross braces 55 and 56 are bolted, or otherwise secured, thereto. The lower ends of the cross braces are bolted, or otherwise secured, to the outwardly extending ends 36 of the supports in a manner to impart a substantial rigidity to the entire structure.

The sliding action of the guide rod 30 relative to the guide rod 20 in a rearward direction is limited by the stop 57 which comprises a band 58 adapted to substantially encircle the rod 20. The extremities of the band are bent outwardly in spaced relation to receive the bolt 59 whereby tightening of the nut 60 on the threaded end of the bolt will fixedly associate the stop with the bar and in contactual relation with the forward support 32 to effectively limit sliding movement of the support in the direction of the plow.

The operation of my device is as follows:

The leaf lifting attachment is particularly adapted to be used for the cultivation of large leafed plants such as tobacco, or the like. The lifting bars 17 and 18 are spaced laterally of the plow beam in a manner whereby movement of the plow between adjacent rows of plants will position the leaf lifters in close proximity to the rows. As the plow is pulled between the rows of plants, the forward end of the leaf lifters will pass under the lowermost leaves and raise the same so that the plow may throw the dirt to one side and against the roots of the plants but under the elevated lower leaves. The runners 51 carried by the lifting bars 17 and 18 will hold the forward ends 42 of the lifters spaced above the ground and will accommodate the same to normal undulations of the surface of the ground by pivoting of the U-shaped brackets 46 within the eye-bolts 63.

The unique manner in which the supports are attached to the stationary rods will permit the heads of the eye-bolts 38 to rise above the rod 20 when the plow is tilted to guide the same thus preventing the forward end of the lifter from being embedded in the ground.

During the cultivation of the plants, difficulties have frequently arisen by the contact of the forward end of the lifting bars with an immovable object, such as a rock or a stump, and the present invention is characterized by the fact that such engagement will cause the supports, sliding rod and lifting bars to release themselves from the plow beam, thus avoiding injury to the lifters. The lifters are also permitted to adjust themselves to substantial irregularities in the surface of the ground by pivotal movement within the eye-bolts 63 and about the stationary guide rod 29; however, upon engagement of the forward end thereof with a rock or stump, the continued forward movement of the plow beam will cause the rearward curved end of the sliding guide rod to move upwardly to disengage from the stationary rod and to pivot about the eye-bolts securing the forward support 32 to the rod 29. If the plow strikes the obstructing object with sufficient violence, the entire unit of sliding rod, supports, and lifters will be caused to pivot upwardly and forwardly in a vertical plane and to disengage from the stationary rod. After the plow has passed the obstructing object the above unit may again be dropped into engagement with the stationary guide rod in the manner hereinbefore described.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. A leaf lifting attachment for plows comprising guide members carried by and disposed laterally of the plow beam, guide rods rockably mounted on the guides and having a limited axial sliding movement thereon, vertically adjustable supporting arms secured to the guide rods, and lifters held in forwardly and downwardly inclined relation to the ground by the said supporting arms.

2. A leaf lifting attachment for plows comprising stationary guide rods disposed laterally of the plow beam; movable guide rods having end portions curving around and partially under the stationary rods; supporting arms; clamp means fastening the arms to the movable rods, parts of the said clamp means extending above and engaging the stationary rod to support the arms thereon; and lifters held in forwardly and downwardly inclined relation to the ground by the said supporting arms.

3. A leaf lifting attachment for plows comprising stationary guide rods disposed laterally of the plow beam; movable guide rods having end portions curving around and partially under the stationary rods; supporting arms; clamp means fastening the arms to the movable rods, parts of said clamp means extending above and engaging the stationary rods to support the arms thereon; lifters pivoted to the supporting arms; and ground engaging runners carried by the lifters, said runners maintaining the forward ends of the lifters spaced slightly above the ground and acting to rock the lifters relative to the supporting arms to accommodate the same to slight undulation in the surface of the ground.

4. In a leaf lifting attachment for plows, means for attaching the lifter to the plow beam comprising the combination of stationary guide rods disposed laterally of the plow beam; movable guide rods having end portions curving around and partially under the stationary rods; supporting arms holding the leaf lifters spaced slightly above the ground, parts of the said arms extending between the stationary rod and the plow beam, and bearing against the said plow beam to prevent pivotal movement of the arms in the direction of the beam; clamp means fastening the arms to the movable rods, parts of said clamp means extending above and engaging the stationary rods to support the arms thereon, whereby engagement of the lifters with an immovable object will permit the movable guide rod and the supporting arms to move upwardly relative to the stationary guide rod.

5. In a leaf lifting attachment for plows, means for attaching the lifters to the plow beam comprising stationary guide rods disposed laterally of the plow beam; movable guide rods having end portions curving around and partially under the stationary rods; substantially U-shaped supporting members disposed in embracing relation to the said movable and stationary guide rods, the inner arms thereof being unattached and bearing against the plow beam to prevent movement of the members in the direction of the beam but permitting movement thereof in a direction away from the said beam, the outer arms of the supporting members holding the leaf lifters spaced slightly above the ground; and clamp means fastening the outer arm of the said members to the movable rods, parts of said clamp means extending above and in engagement with the stationary rods, whereby engagement of the lifters with an immovable object will permit the movable guide rod and the supporting arms to move upwardly relative to the stationary guide rod.

6. A leaf lifting attachment for plows comprising guide members carried by and disposed laterally of the plow beam at opposite sides thereof; supporting carriages disposed at opposite sides of the beam and having a sliding and releasable connection with the guide members; adjustable means to limit the sliding movement of the supporting carriages relative to the guide members; and leaf lifters held in forwardly and downwardly inclined relation to the ground by the supporting carriages, said carriages being adapted to disengage from the guide member upon engagement of the leaf lifter with an immovable object.

7. A leaf lifting attachment for plows comprising guide members carried by and disposed laterally of the plow beam at opposite sides thereof; a supporting carriage disposed at each side of the beam and having a sliding and releasable connection with the guide members, parts of said carriages bearing against the beam to prevent pivotal movement of the carriage in the direction of the beam but permitting movement thereof in a direction away from said beam; adjustable stop means to limit the sliding movement of the carriages relative to the guide members; leaf lifters pivoted to the carriages; and ground engaging runners carried by the lifters, said runners maintaining the lower ends of the lifters spaced slightly above the ground and acting to rock the lifters about the said carriages to accommodate the same to undulations in the surface of the ground, said carriages being adapted to disengage from the guide member upon engagement of the leaf lifter with an immovable object.

WILLIAM S. COTTLE.